United States Patent Office 2,983,711
Patented May 9, 1961

---

2,983,711

FLUORINE-CONTAINING SILANES AND THEIR HYDROLYSIS PRODUCTS

Arthur F. Gordon, Midland, Mich., assignor to Dow Corning Corporation, Midland, Mich., a corporation of Michigan No Drawing. Filed Mar. 14, 1955, Ser. No. 494,287

12 Claims. (Cl. 260—46.5)

This invention relates to fluorine-containing silanes having a halogenated cyclobutyl group on the silicon and to the siloxanes derived therefrom.

This application is a continuation in part of applicant's copending application Serial No. 399,585, filed December 21, 1953, now abandoned.

It has long been known that organopolysiloxanes wherein the organic groups are hydrocarbon radicals (particularly methyl and phenyl radicals) have excellent thermal stability and many desirable properties. As a consequence these materials have become of considerable commercial importance. However, the hydrocarbon siloxanes suffer from two defects, one is that they are relatively poor lubricants and the other is that the elastomers and resins made from such siloxanes have relatively poor resistance to hydrocarbon solvents and to hydrocarbon oils.

It is the object of this invention to improve the lubricity and resistance to hydrocarbon solvents of siloxane resins and elastomers. Another object is to prepare halogen substituted organosiloxanes which are thermally and hydrolytically stable. Other objects and advantages will be apparent from the following description.

This invention relates to silanes of the formula

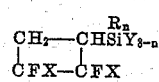

in which R is a monovalent hydrocarbon radical free of aliphatic unsaturation, X is of the group F, Cl and halohydrocarbon radicals of the group $CF_3-$, $C_2F_5-$, $CF_2=CF-$ and $CFCl=CF-$, only one of the X in any one molecule being a halohydrocarbon radical, Y is a halogen atom and $n$ has an average value from 0 to 2 inclusive.

These silanes are prepared by reacting vinyl silanes of the formula

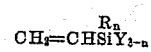

with an ethylenic fluorocarbon of the group tetrafluoroethylene, trifluorochloroethylene, sym-dichlorodifluoroethylene, perfluoropentene, perfluorobutene, perfluorobutadiene and 1,4-dichloro-1,2,3,4-tetrafluorobutadiene and mixtures thereof. The reaction is best carried out under pressure at a temperature of at least 125° C. Preferably the temperature is 150° C. or above. Under these conditions addition of the ethylenic fluorocarbon to the vinyl radical of the silane takes place to produce a cyclobutyl derivative as shown in the above formula. In those cases where tetrafluoroethylene and sym-dichlorodifluoroethylene are employed only one isomer is possible. In all other cases two isomers are possible and a mixture of them is usually produced. For example when $CFCl=CF_2$ is reacted with $CH_2=CHSi\equiv$, the chlorine atom can be either cis or trans with respect to the silicon depending on the orientation of the chlorotrifluoroethylene relative to the vinyl group on the silicon at the time of reaction.

For the purpose of this invention the ethylenic fluorocarbon can be reacted with a vinyltrihalosilane or it can be reacted with a vinylhydrocarbonylhalosilane which contains one or two monovalent hydrocarbon radicals which are free of aliphatic unsaturation. Thus, for example, vinyl silanes which are operative in this invention are vinyltribromosilane, vinylmethyldichlorosilane, vinyldimethylchlorosilane, vinyloctadecyldichlorosilane, vinylphenyldibromosilane, vinylbenzyldifluorosilane, vinylxenyldichlorosilane and vinylphenylmethylchlorosilane. Thus, it can be seen that the various R groups can be the same or different hydrocarbon radicals.

This invention further relates to siloxanes of the formula

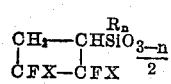

in which R, X and $n$ are as above defined. These siloxanes are prepared by hydrolyzing the above halosilanes in the normal manner for hydrolyzing halosilanes. If desired, the hydrolysis can be carried out in the presence of an inert solvent such as benzene, toluene, and the like.

The siloxanes of this invention can be copolymerized with any siloxane of the formula

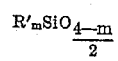

where R' is a nonhydrolyzable organic radical. Preferably R' is a monovalent hydrocarbon radical and $m$ has an average value from 1 to 3 inclusive. The siloxanes of this invention can appear in the copolymer in any amount as for example from .1 to 99.9 mol percent. The copolymerization may be carried out either by cohydrolyzing the corresponding hydrolyzable silanes or by catalytic copolymerization of the siloxanes of this invention with hydrocarbon substituted siloxanes. Preferably the catalytic copolymerization should be carried out in the presence of an acid catalyst.

It should be understood that R' can be any monovalent hydrocarbon radical such as alkyl, alkenyl, aryl, alkaryl, cycloaliphatic and aralkyl radicals. The siloxanes of this invention either alone or when copolymerized with each other or when copolymerized with monovalent hydrocarbon substituted siloxanes can be made into the form of fluids, elastomers and resins by varying the ratio of the organic radical on the silicon atom from 3 to 1.

The siloxanes of this invention are particularly adapted for the formation of solvent resistant siloxane elastomers. For this purpose it is preferable that they be copolymerized with hydrocarbon substituted siloxanes, such as dimethylsiloxane. The siloxane polymers are compounded with fillers and vulcanizing agents such as organic peroxides and then cured to elastomers in the usual manner for preparing siloxane elastomers. The resulting products are much more resistant to swelling by hydrocarbon oils than are siloxane elastomers which contain only monovalent hydrocarbon radicals on the silicon. Also the elastomers containing the siloxanes of this invention are less inflammable than are those having only monovalent hydrocarbon radicals.

When the siloxanes of this invention are made in the form of fluids or greases they show improved lubricating properties over the hydrocarbon substituted siloxanes. In addition the siloxanes of this invention are stable both with respect to heat and to hydrolysis of the halogen atoms on the cyclobutyl group.

The following examples are illustrative only and should not be construed as limiting the invention which is properly set forth in the appended claims.

Example 1

370 g. of chlorotrifluoroethylene and 491.5 g. of vinylmethyldichlorosilane were placed in an autoclave and heated 24 hours at 150° C. The autoclave was cooled and the products distilled to give a material, B.P. 169 to 171° C. at atmospheric pressure, and having the following properties $n_D^{25}$ 1.4240, $d_4^{25}$ 1.426, M.R. 46.06. This material was a mixture of the following isomeric chlorosilanes,

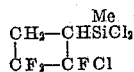

and

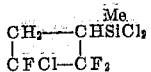

Example 2

96 g. of chlorotrifluoroethylene and 162 g. of phenylvinyldichlorosilane were heated in an autoclave for 24 hours at 150° C. Upon distillation of the reaction product the material boiling about 135° C. at 21 mm. was isolated which was a mixture of the following isomeric chlorosilanes

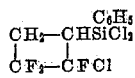

and

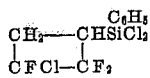

This material had the following properties: $n_D^{25}$ 1.5002, $d_4^{25}$ 1.385, M.R. 64.99.

When these isomeric chlorosilanes are hydrolyzed by adding them to a mixture of toluene and water and the resulting product is thereafter heated at 150° C. for 5 hours, a viscous fluid polysiloxane having the unit formulae

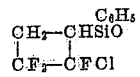

and

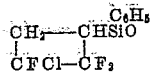

is obtained.

Example 3

101 g. of the mixed silanes of Example 1 were hydrolyzed by adding thereto 1 mol of water over a period of ½ hour. The mixture was stirred for ½ hour and 200 ml. of concentrated HCl was added. After stirring for 16 hours the HCl was drawn off at 100° C. at 20 mm. pressure over a 24-hour period. The organic layer was separated and stripped to 160° C. at 7 mm. A viscous liquid polymeric siloxane having the unit formulae

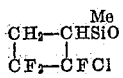

and

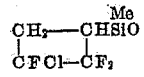

was obtained.

Example 4

Copolymeric siloxane fluids were prepared by cohydrolyzing 45 mol percent dimethyldichlorosilane, 45 mol percent of the trifluoromonochlorocyclobutylmethyldichlorosilane of Example 1 and 10 mol percent trimethylchlorosilane in the manner of Example 3. The resulting copolymeric siloxane fluid showed good lubricity when tested on a Falex testing machine. Equivalent results were obtained when 90 mol percent of the trifluoromonochlorocyclobutyldichlorosilane was cohydrolyzed in a like manner with 10 mol percent trimethylchlorosilane.

Example 5

99 g. of water were added dropwise to a mixture of 580.5 g. of dimethyldichlorosilane and 128.7 g. of the mixed isomeric trifluorochlorocyclobutylmethyldichlorosilanes of Example 1. After stirring for 15 minutes, 250 ml. concentrated HCl was added. The reaction mixture was stirred for 17 hours at atmospheric pressure and 48 hours at 12 mm. pressure to remove the HCl. The resulting product was a viscous high polymeric material containing 90 mol percent $Me_2SiO$ units and 10 mol percent $(F_3ClC_4H_3)MeSiO$ units.

100 parts by weight of this copolymer was milled with 40 parts by weight of a fumed silica, .5 part by weight ferric oxide and 1 part by weight t-butylperbenzoate. The resulting material was vulcanized by heating 15 minutes at 150° C. A sample of this rubber was immersed in ASTM No. 3 oil for 24 hours at 150° C. The sample underwent a 28% increase in volume. By comparison a siloxane rubber of an identical composition except that it contained only dimethylsiloxane polymer increased in volume 54% when immersed in the ASTM No. 3 oil for 24 hours at 150° C. This test shows the improved resistance to hydrocarbon oils of elastomers including the siloxanes of this invention over siloxane elastomers which do not contain these elastomers. Less swelling is encountered when more than 10 mol percent of the trifluoromonochlorocyclobutylmethylsiloxane is incorporated in the elastomer.

Example 6

579.6 g. of dimethyldichlorosilane, 128.5 g. of the isomeric trifluorochlorocyclobutylmethyldichlorosilane of Example 1 and 2.12 g. of vinylmethyldichlorosilane were mixed and 99 g. of water were added thereto dropwise. During the addition of the water the temperature was maintained at 20 to 30° C. The mixture was stirred 10 minutes and then 250 ml. of concentrated HCl was added and the mixture stirred for 16 hours. The pressure was then maintained to 20 mm. for 72 hours. The polymer was washed for ½ hour and compounded into a rubber and vulcanized in the manner of Example 5. The elastomer showed excellent resistance to swelling by hydrocarbon solvents.

Example 7

When 3.15 mols of chlorotrifluoroethylene and 3.5 mols of vinyltribromosilane are reacted in the manner of Example 1, a mixture of the isomeric silanes having the formulae

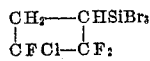

and

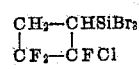

is obtained.

When these silanes are hydrolyzed in accordance with the procedure of Example 2 the siloxane having the unit formulae

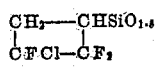

and

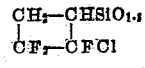

is obtained.

Example 8

When 3.15 mols of tetrafluoroethylene is reacted with 3.5 mols of vinylmethyldichlorosilane in the manner of Example 1 the chlorosilane having the formula

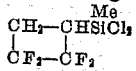

is obtained.

When this chlorosilane is hydrolyzed in accordance with the method of Example 3 a polymeric siloxane having the unit formula

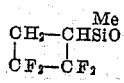

is obtained.

Example 9

When 3.5 mols of vinyldimethylfluorosilane is reacted with 3.15 mols of tetrafluoroethylene in accordance with the method of Example 1 the fluorosilane

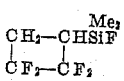

is obtained.

When this silane is hydrolyzed with sodium carbonate solution the disiloxane having the formula

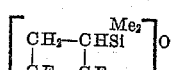

is obtained.

Example 10

When 1 mol of CClF=CClF is heated in an autoclave with 1 mol of vinyltrichlorosilane at 200° C. for 24 hours

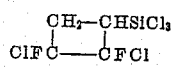

is obtained. When this material is hydrolyzed a resinous siloxane having the unit formula

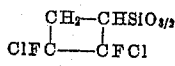

is obtained.

Example 11

When 1 mol of perfluorobutene-1,2 is reacted with 1 mol of vinylmethyldichlorosilane at 150° C. under superatmospheric pressure for 24 hours, a mixture of

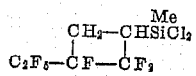

and

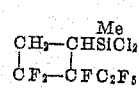

is obtained.

When these materials are hydrolyzed an oil which is a copolymer of

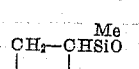

and

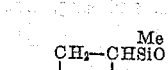

is obtained.

Example 12

106 g. of vinylmethyldichlorosilane and 141 g. of perfluorobutadiene-1,3 were heated in an autoclave for 19 hours at 170 to 180° C. The autoclave was cooled and the reaction product was distilled whereupon there was obtained a material boiling at 80° C. at 6 mm. which had a sp. gr. at 25° C. of 1.485 and $n_4{}^{25}$ 1.4211. The molar refraction of the compound was 51.73 showing that it had the formula

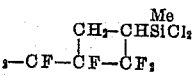

When this material is hydrolyzed a siloxane fluid having the unit formula

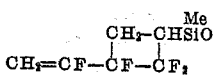

is obtained.

Example 13

134.4 g. of vinylmethyldichlorosilane and 170 g. of 1,4-dichloro-1,2,3,4-tetrafluorobutadiene-1,3 were heated in an autoclave for 21 hours at 150° C. and for 18 hours at 200° C. The autoclave was cooled and the reaction product was distilled to obtain a material boiling 85° C. at 5 mm. which had a sp. gr. at 25° C. of 1.515 and $n_4{}^{25}$ 1.4575. This material had a molar refraction of 60.45 which showed it to be the compound

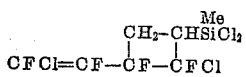

When this material is hydrolyzed a siloxane fluid of the unit formula

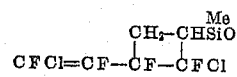

is obtained.

Example 14

When 1 mol of perfluoropropene is reacted with 1 mol of vinylethyldichlorosilane at 200° C. for 24 hours the compound

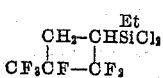

is obtained.

When this compound is hydrolyzed a fluid siloxane of the formula

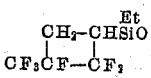

is obtained.

Example 15

This example is illustrative of an alternative method of preparing the siloxanes of this invention. The method involves reacting any one or more of the defined ethylenic fluorocarbons with a vinyl-containing siloxane. The vinyl-containing siloxanes can be homopolymeric such as for example vinylmethylsiloxane or copolymeric as is specifically shown below. By using this method the halocyclobutyl groups can be introduced directly into a previously prepared organopolysiloxane and the method is particularly useful in the preparation of the copolymers described and claimed in this invention. A specific example of this method is given below.

510.4 g. of chlorotrifluoroethylene and 1232 g. of vinylheptamethylcyclotetrasiloxane were heated in an autoclave for 18 hours at 150° C. The autoclave was cooled and the reaction product was distilled to give a fluid which had the following properties: B.P. 89 to 90° C. at 24 mm., $n_4{}^{25}$ 1.4070 and $d^{25}$ 1.137. The molar refraction of this fluid was found to be 91.86 which shows that the material was mono(chlorotrifluorocyclobutyl)-heptamethylcyclotetrasiloxane. The structure was further verified by nuclear magnetic resonance studies.

Example 16

3 mols of 2,4-divinyl-2,4,6,6,8,8-hexamethylcyclotetrasiloxane and 3 mols of chlorotrifluoroethylene were heated in an autoclave 8 hours at 200° C. The autoclave was cooled and the reaction products were distilled to give 2-vinyl-4-chlorotrifluorocyclobutyl - 2,4,6,6,8,8-hexamethylcyclotetrasiloxane boiling point 124° C. at 10 mm., $n^{25}$ 1.4142, $d^{25}$ 1.146 and molar refraction 95.29.

There was also obtained 2,4-bis(chlorotrifluorocyclobutyl) - 2,4,6,6,8,8 - hexamethylcyclotetrasiloxane, B.P. 167° C. at 10 mm., $n^{25}$ 1.4159, $d^{25}$ 1.279 and molar refraction 106.2.

That which is claimed is:

1. A halosilane of the formula

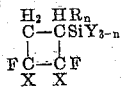

where R is a monovalent hydrocarbon radical free of aliphatic unsaturation, X is of the group consisting of F, Cl and halohydrocarbon radicals of the group consisting of $CF_3$—, $C_2F_5$, $CF_2=CF$— and $CFCl=CF$—, not more than one X in any one molecule being a halohydrocarbon radical, Y is a halogen atom and n has an average value from 0 to 2 inclusive.

2.

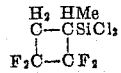

3.

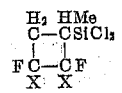

where one of the X's is a chlorine and the other is fluorine.

4.

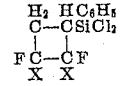

where one of the X's is chlorine and the other is fluorine.

5. The method which comprises hydrolyzing a silane of the formula

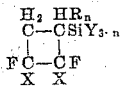

in which R is a monovalent hydrocarbon radical free of aliphatic unsaturation, X is of the group consisting of F, Cl and halohydrocarbon radicals of the average group consisting of $CF_3$—, $C_2F_5$—, $CF_2=CF$— and $CFCl=CF$—, not more than one X in any one molecule being a halohydrocarbon radical, Y is a halogen atom and n has an average value from 0 to 2 inclusive, by contacting said silane with water whereby a siloxane of the average unit formula

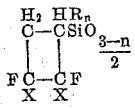

where R, X and n are as above defined, is obtained.

6. A siloxane of the average unit formula

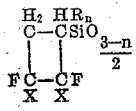

where R is a monovalent hydrocarbon radical free of aliphatic unsaturation, X is of the group consisting of F, Cl and halohydrocarbon radicals of the group consisting of $CF_3$—, $C_2F_5$—, $CF_2=CF$—, and $CFCl=CF$—, not more than one X in any one siloxane unit being a halohydrocarbon radical, and n has an average value from 0 to 2 inclusive.

7. A polysiloxane having the unit formula

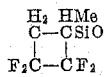

8. A polysiloxane having the unit formula

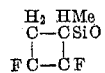

where one X is chlorine and the other is fluorine.

9. A polysiloxane having the unit formula

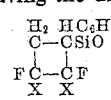

where one X is chlorine and the other is fluorine.

10. A copolymeric siloxane which is composed of siloxane units of the average formula

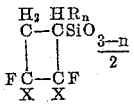

where R is a monovalent hydrocarbon radical free of aliphatic unsaturation, X is of the group consisting of F, Cl and halohydrocarbon radicals of the average group consisting of $CF_3$—, $C_2F_5$—, $CF_2=CF$—, and $CFCl=CF$—, not more than one X in any one siloxane unit being a halohydrocarbon radical and n has an average value from 0 to 2 inclusive, and siloxane units of the average formula

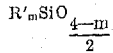

where R' is a monovalent hydrocarbon radical and m has an average value from 1 to 3 inclusive.

11. Mono(chlorotrifluorocyclobutyl)heptamethylcyclotetrasiloxane.

12. A polyorganosiloxane having silicon atoms to which are attached by carbon-silicon bonds monovalent cyclobutyl radicals carrying substituents in each of their 2 and 3 positions only, each said substituent being halogen of the group consisting of fluorine and chlorine, there being a total of 3 fluorine atoms and 1 chlorine atom in said positions, any remaining organo groups of said polyorganosiloxane being monovalent hydrocarbon radicals free of aliphatic unsaturation.

References Cited in the file of this patent

UNITED STATES PATENTS

| | | |
|---|---|---|
| 2,462,345 | Barrick | Feb. 22, 1946 |
| 2,596,967 | Frost | May 10, 1952 |
| 2,697,089 | Kleiman | Dec. 14, 1954 |

OTHER REFERENCES

Wagner et al.: Ind. and Eng. Chem., February 1953, pp. 367–371.

UNITED STATES PATENT OFFICE
CERTIFICATION OF CORRECTION

May 9, 1961

Patent No. 2,983,711

Arthur F. Gordon

It is hereby certified that error appears in the above numbered patent requiring correction and that the said Letters Patent should read as corrected below.

Column 2, line 22, after "toluene," insert -- ether, --; column 6, lines 4 to 6, the formula should appear as shown below instead of as in the patent:

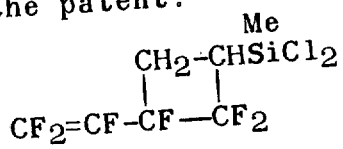

column 6, lines 10 to 12, the formula should appear as shown below instead of as in the patent:

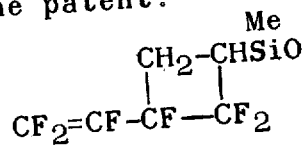

column 7, line 49, strike out -- average --.

Signed and sealed this 28th day of November 1961.

(SEAL)
Attest:

ERNEST W. SWIDER
Attesting Officer

DAVID L. LADD
Commissioner of Patents